United States Patent
Rupp et al.

(10) Patent No.: US 12,436,240 B2
(45) Date of Patent: Oct. 7, 2025

(54) SENSOR MOUNTING ASSEMBLY IN VEHICLES

(71) Applicant: Honda Motor Co., Ltd., Tokyo (JP)

(72) Inventors: Timothy J Rupp, Dublin, OH (US); David J Rose, West Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 18/471,021

(22) Filed: Sep. 20, 2023

(65) Prior Publication Data

US 2025/0093470 A1 Mar. 20, 2025

(51) Int. Cl.
| | |
|---|---|
| *G01S 7/481* | (2006.01) |
| *B60R 11/00* | (2006.01) |
| *G01S 13/931* | (2020.01) |
| *G01S 17/931* | (2020.01) |

(52) U.S. Cl.
CPC .......... *G01S 7/4813* (2013.01); *G01S 17/931* (2020.01); *B60R 2011/0028* (2013.01); *B60R 2011/004* (2013.01); *B60R 2011/0042* (2013.01); *G01S 2013/93273* (2020.01)

(58) Field of Classification Search
CPC .............. G01S 7/4813; G01S 17/931; G01S 2013/93273; B60R 2011/0028; B60R 2011/004; B60R 2011/0042
See application file for complete search history.

(56) References Cited

U.S. PATENT DOCUMENTS

| | | |
|---|---|---|
| 10,071,773 B2 | 9/2018 | Williams et al. |
| 10,144,424 B2 | 12/2018 | Hara et al. |
| 11,710,894 B1 * | 7/2023 | Espinal ................ H01Q 1/3275 |
| | | 348/148 |
| 2018/0015886 A1 * | 1/2018 | Frank ...................... B60R 11/04 |
| 2020/0023788 A1 * | 1/2020 | Frederick .................. G01S 7/02 |
| 2021/0364631 A1 * | 11/2021 | Hasegawa ............... G01S 13/86 |
| 2022/0169314 A1 | 6/2022 | Huelsen et al. |
| 2022/0212609 A1 | 7/2022 | Li et al. |
| 2024/0326717 A1 * | 10/2024 | Linner .................... G01S 7/027 |
| 2025/0067846 A1 * | 2/2025 | Rupp ..................... G01S 17/931 |
| 2025/0136021 A1 * | 5/2025 | Rupp ..................... B60R 11/04 |

FOREIGN PATENT DOCUMENTS

| | | |
|---|---|---|
| CN | 114312589 A | 4/2022 |
| CN | 216232036 U | 4/2022 |
| CN | 217022384 U | 7/2022 |
| CN | 217112721 U | 8/2022 |
| CN | 217347676 U | 9/2022 |
| CN | 218085331 U | 12/2022 |
| JP | 5672539 B2 | 2/2015 |
| KR | 19980012722 U | 6/1998 |

* cited by examiner

*Primary Examiner* — Ryan D Walsh (74) *Attorney, Agent, or Firm* — Mark Duell; American Honda Motor Co., Inc.

(57) ABSTRACT

A sensor mounting assembly is provided. The sensor mounting assembly includes a cover having a base portion and a shroud portion. The base portion is coupled to a glass roof of a vehicle and forms a first protrusion. The shroud portion has a first extension that is coupled to the first protrusion and encloses a sensor that is disposed proximate to the glass roof of the vehicle. The sensor mounting assembly further includes a bracket coupled to a roof rail that is located beneath the glass roof of the vehicle. The bracket is secured to the roof rail from an interior cabin of the vehicle, to hold the sensor proximate to the glass roof of the vehicle.

20 Claims, 4 Drawing Sheets

SENSOR MOUNTING ASSEMBLY IN VEHICLES

BACKGROUND

Vehicles generally have multiple sensors, which may be configured to sense various information based on which several operations of the vehicle are controlled. For example, the vehicle may include vision sensors, such as, one of: a charge coupled device (CCD) sensor, a complementary metal oxide semiconductor (CMOS) sensor, a RADAR sensor, a LiDAR sensor, an infrared sensor, and the like, which may be used to control movements of the vehicle. In certain instances, the vision sensors may be located on a roof of the vehicle, to facilitate an optimal field-of-view for the vision sensors. In certain instances, it may be difficult for an operator to perform precise positioning and assembly of the vision sensors on the roof of the vehicle, which may eventually impact ergonomics in an assembly line of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a sensor mounting assembly is provided. The sensor mounting assembly may include a cover having a base portion and a shroud portion. The base portion may be coupled to a glass roof of a vehicle and forms a first protrusion. The shroud portion may have a first extension that may be coupled to the first protrusion and configured to enclose a sensor that is disposed proximate to the glass roof of the vehicle. The sensor mounting assembly may further include a bracket coupled to a roof rail that may be located beneath the glass roof of the vehicle. The bracket may be configured to be secured to the roof rail from an interior cabin of the vehicle, to hold the sensor proximate to the glass roof of the vehicle.

According to an embodiment of the disclosure, a sensor mounting assembly is disclosed. The sensor mounting assembly may include a cover having a base portion and a shroud portion. The base portion may be coupled to a glass roof of a vehicle and forms a first protrusion. The shroud portion may have a first extension that may be coupled to the first protrusion and configured to enclose a sensor that may be disposed proximate to the glass roof of the vehicle. The sensor mounting assembly may further include a bracket coupled to a roof rail that may be located beneath the glass roof of the vehicle and configured to be secured to the roof rail from an interior cabin of the vehicle to hold the sensor proximate to the glass roof of the vehicle. The base portion may be pre-assembled with the glass roof, and the shroud portion may be removably coupled to the base portion, such that, the shroud portion may be configured to be removed from exterior of the vehicle, in a service event of the sensor.

According to another embodiment of the disclosure, a method for forming a sensor assembly is provided. The method may include coupling a base portion to a glass roof of a vehicle. The base portion may form a first protrusion. The method may further include coupling a shroud portion to the base portion, the shroud portion may have a first extension that may be coupled to the first protrusion. The shroud portion may be configured to enclose a sensor that may be disposed proximate to the glass roof of the vehicle. The method may further include securing the sensor to a portion of a bracket. The bracket may be configured to hold the sensor proximate to the glass roof of the vehicle. The method may further include coupling the bracket to a roof rail that may be located beneath the glass roof of the vehicle. The bracket may be configured to be secured to the roof rail from an interior cabin of the vehicle.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed sensor mounting assembly. The sensor mounting assembly may include a cover having a base portion and a shroud portion. The base portion may be coupled to a glass roof of a vehicle and forms a first protrusion (for example, a male connector). The shroud portion may have a first extension (for example, a female connector) that may be coupled to the first protrusion and configured to enclose a sensor that is disposed proximate to the glass roof of the vehicle. Such coupling between the first extension and the first protrusion, may facilitate the shroud portion to be selectively removable from the base portion. Hence, it may be easier for an operator to perform precise positioning and assembly of the sensor on the roof of the vehicle, which may eventually improve ergonomics in an assembly line of the vehicle. Further, it may also be noted that the shroud portion may also be selectively removable from the base portion in a service event (for example, a repair/replacement) of the sensor. Hence, as there may not be a requirement to completely remove the cover and only selective removal of the shroud portion may be required for the service event, there may be a substantial timesaving in the service event of the sensor.

The sensor mounting assembly may further include a bracket that may be coupled to a roof rail that may be located beneath the glass roof of the vehicle. The bracket may be configured to be secured to the roof rail from an interior cabin of the vehicle, to hold the sensor proximate to the glass roof of the vehicle. As the bracket and the sensor are configured to be secured to the roof rail from the interior cabin of the vehicle, there may not be a need for the operator to climb on to the roof of the vehicle for positioning and assembling the sensor. Hence, it may be further easier for the operator to perform precise positioning and assembly of the sensor on the roof of the vehicle, which may further improve ergonomics in the assembly line of the vehicle.

Reference will now be made in detail to specific aspects or features, examples of which are illustrated in the accompanying drawings. Wherever possible, corresponding, or similar reference numbers will be used throughout the drawings to refer to the same or corresponding parts.

Figure 1:
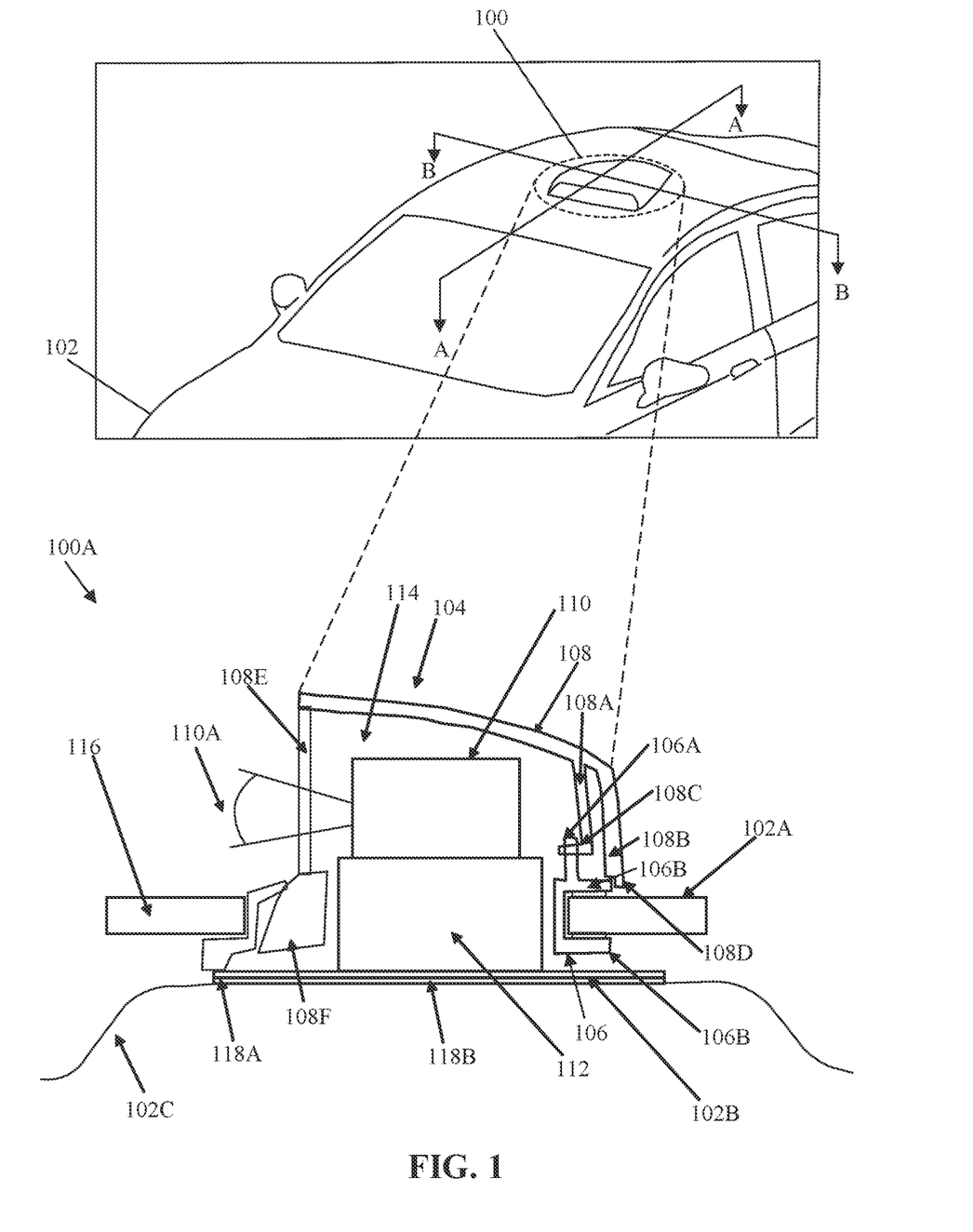
FIG. 1 is a diagram that illustrates an isometric view of a sensor mounting assembly for a vehicle, in accordance with an embodiment of the disclosure.

FIG. 1 is a diagram that illustrates an isometric view of a sensor mounting assembly for a vehicle, in accordance with an embodiment of the disclosure. With reference to FIG. 1, there is shown a sensor mounting assembly 100 for a vehicle 102.

The sensor mounting assembly 100 has a suitable design, shape, and structure, which may be configured to secure a sensor of the vehicle 102. For example, the sensor mounting assembly 100 may generally include multiple components, for example, a cover and a bracket. The bracket may be configured to hold and secure the sensor of the vehicle 102 and the cover may be configured to enclose the sensor of the vehicle 102. In an embodiment, the sensor mounting assembly 100 may be located on a top surface of the vehicle 102. In another embodiment, the sensor mounting assembly 100 may be located on a frontal portion of the top surface of the vehicle 102. The sensor mounting assembly 100 may generally have a substantially arcuate profile, to improve aerodynamics of the vehicle 102. However, it may be noted that the substantially arcuate profile is merely an example and the sensor mounting assembly 100 may include any structural profile, for example, a rectangular profile, a square profile, a polygonal profile, and the like. Based on user requirements and structural aspects of the vehicle 102, such structural profile of the sensor mounting assembly 100 may be modified.

Figure 2:
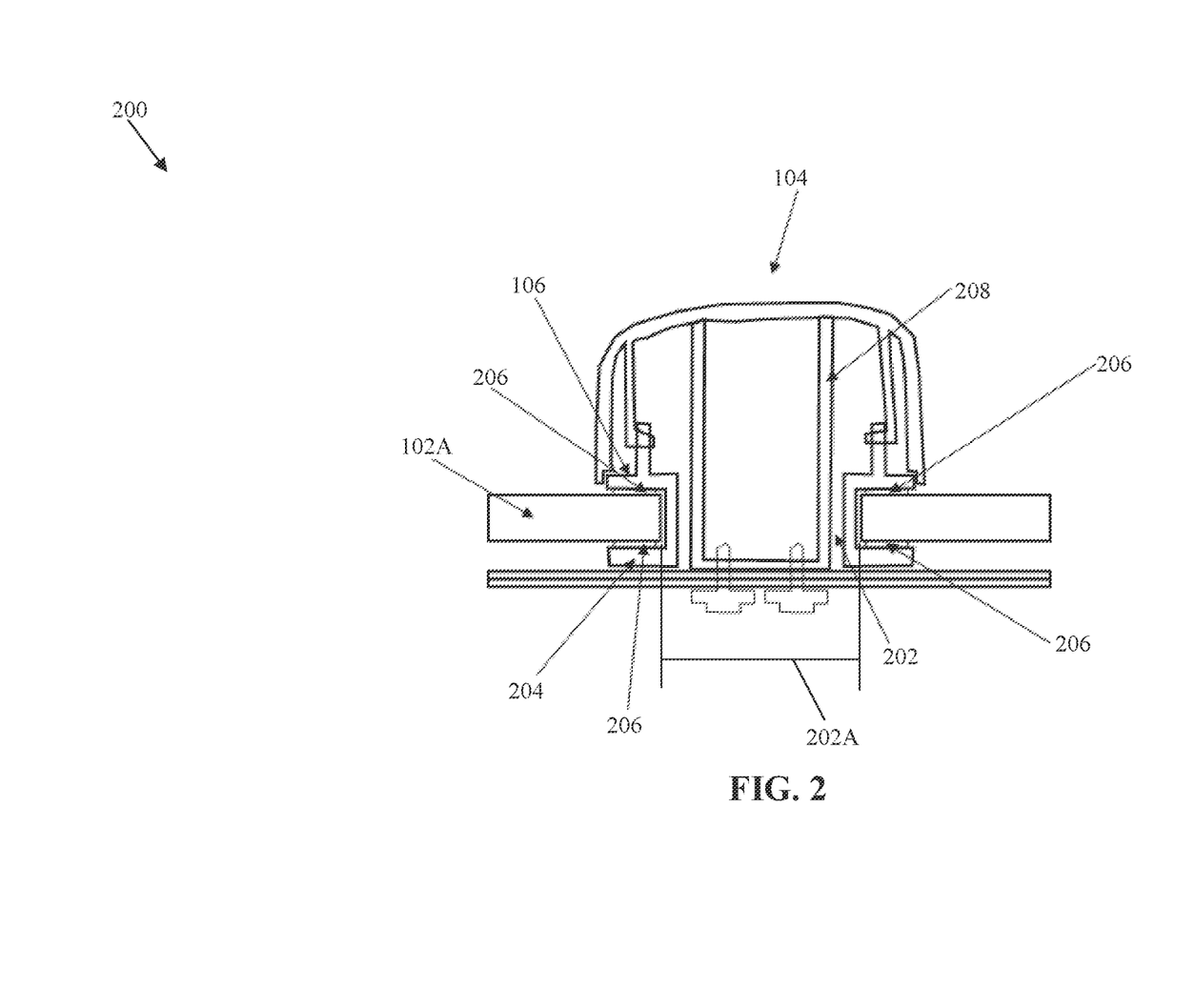
FIG. 2 is a diagram that illustrates a cross-sectional view of the sensor mounting assembly of FIG. 1, in accordance with an embodiment of the disclosure.

The vehicle 102 may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. Examples of the vehicle 102 may include, but are not limited to, a two-wheeler vehicle, a three-wheeler vehicle, or a four-wheeler vehicle. It may be noted here that the vehicle 102 shown as the four-wheeler vehicle in FIG. 1, is merely shown as example. The present disclosure may be also applicable to other types of vehicles, such as, two-wheeler vehicles (for example, a scooter) or three-wheeler vehicles, or other multi-wheeler vehicles. The description of other types of the vehicle 102 has been omitted from the disclosure for the sake of brevity. In certain cases, the vehicle 102 may also be a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other individual forms of alternative energy sources, or a combination of alternative energy sources. The sensor mounting assembly 100 and the vehicle 102 of FIG. 1 is illustratively cut along a first section A-A (as shown in FIG. 1) and a second section B-B (as shown in FIG. 2), to describe other components of the sensor mounting assembly 100 and the vehicle 102.

With reference to FIG. 1, there is also shown a cross-sectional view 100A of the sensor mounting assembly 100 and the vehicle 102, which may be sectioned along the first section A-A, as shown in FIG. 1. The vehicle 102 may include a glass roof 102A that may be disposed on a roof (for example, a top surface) of the vehicle 102, a roof rail 102B beneath the glass roof 102A, and an interior cabin 102C to accommodate an occupant or an operator of the vehicle 102.

The glass roof 102A may be a panel that may be fixed to the roof of the vehicle 102. In an embodiment, the glass roof 102A may be a fixed panel that may be fixedly coupled to the roof of the vehicle 102. In another embodiment, the glass roof 102A may be a movable panel that may be moveably coupled to the roof of the vehicle 102. In yet another embodiment, the glass roof 102A may be a fixed panel with a moveable section, such that, the moveable section of the glass roof 102A may be configured to be moveably coupled to the roof of the vehicle 102. The glass roof 102A may be manufactured as a transparent panel or a tinted panel, based on the user preference. In an embodiment, the glass roof 102A is generally supported on the roof rail 102B.

The roof rail 102B may include a plurality of rails which may be secured to the roof of the vehicle 102. In an embodiment, the roof rail 102B may be located beneath the glass roof 102A and configured to secure components of the sensor mounting assembly 100. In another embodiment, the roof rail 102B may also be configured to secure other objects (for example, a cargo) on the roof of the vehicle, so that, there may be increased space in the interior cabin 102C of the vehicle 102.

The interior cabin 102C of the vehicle 102 may be a space in the vehicle, which may be configured to accommodate the occupant or the operator of the vehicle. In certain instances, it may be easier for the operator or the occupant to control components of the sensor mounting assembly 100 from the interior cabin 102C than from the roof of the vehicle 102. For example, in case of a service event of a sensor 110 in the sensor mounting assembly 100, it may be easier for the operator or the occupant to repair components of the sensor mounting assembly 100 from the interior cabin 102C than from the roof of the vehicle 102. Details of the service event is further explained, for example, in FIG. 3.

Further referring to the FIG. 1, the sensor mounting assembly 100 may include a cover 104 that has a base portion 106 and a shroud portion 108, a sensor 110 enclosed by the cover 104, a bracket 112 to secure the sensor 110. The cover 104 may include a suitable design, shape, and structure, which may be configured to enclose the sensor 110. In an example, the cover 104 may form a substantially arcuate enclosure to enclose the sensor 110 on the roof of the vehicle 102. Such substantially arcuate enclosure may allow the sensor 110 to detect a surrounding environment without affecting aerodynamics of the vehicle 102. In an embodiment, the cover 104 may include a two part-structure (for example, the base portion 106 and the shroud portion 108) to enclose the sensor 110. Such two-part structure of the cover 104 may facilitate the operator to perform precise positioning and assembly of the sensor 110 on the roof of the vehicle 102, which may eventually improve ergonomics in an assembly line of the vehicle 102.

In another embodiment, the cover 104 may include one of: the base portion 106 and the shroud portion 108 to enclose the sensor 110. In yet another embodiment, the cover 104 may include more than two portions (such as the base portion 106 and the shroud portion 108) to enclose the sensor 110. The cover 104 may be generally disposed on the roof of the vehicle 102. In an embodiment, the cover 104 may be secured by the glass roof 102A of the vehicle 102. In another embodiment, the cover 104 may be secured by the roof rail 102B of the vehicle 102. In yet another embodiment, the cover 104 may be secured by a combination of the glass roof 102A and the roof rail 102B of the vehicle 102.

Figure 3:
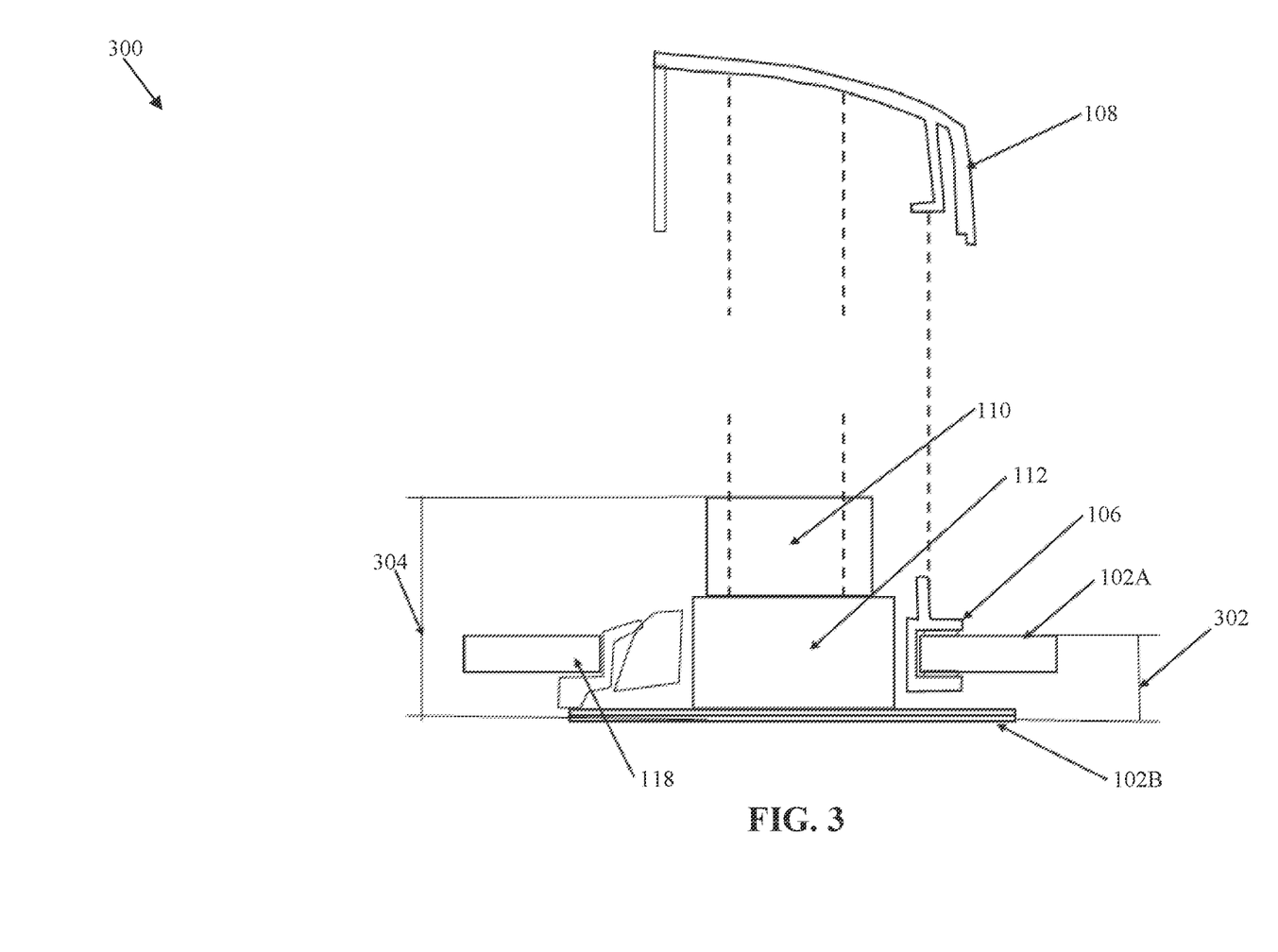
FIG. 3 is a diagram that illustrates an exemplary scenario to perform a service event for the sensor mounting assembly of FIG. 1, in accordance with an embodiment of the disclosure.

The base portion 106 may include a suitable design, shape, and structure, which may be configured to form a substructure (for example, a foundation) for the cover 104. For example, the base portion 106 may include a flange (as shown in FIG. 1, FIG. 2, and FIG. 3), which may be configured to be coupled with the glass roof 102A, to form the substructure for the cover 104. Details of the flange of the base portion 106 is further described, for example, in FIG. 2.

In an embodiment, the base portion 106 may be formed on a rear end of the sensor mounting assembly 100. In another embodiment, the base portion 106 may be formed on a front end of the sensor mounting assembly 100. In yet another embodiment, the base portion 106 may be formed on both the front end and the rear end of the sensor mounting assembly 100. The base portion 106 may have a substantially C-shaped structure, as shown in FIG. 1 and FIG. 2. However, the base portion 106 may have any other structure, such as, but not limited to, a V-shaped structure, a H-shaped structure, a U-shaped structure, and the like. In an embodiment, the base portion 106 may include a first protrusion 106A and a second protrusion 106B.

The first protrusion 106A may be an extension that may extend from the base portion 106 and configured to couple with the shroud portion 108. For example, the first protrusion 106A may vertically extend from the base portion 106 and such vertically extended first protrusion 106A may be configured to couple with a part of the shroud portion 108 to form the cover 104. In another example, the first protrusion 106A may be angularly extended from the base portion 106 and such angularly extended first protrusion 106A may be configured to couple with the part of the shroud portion 108 to form the cover 104. In an embodiment, the first protrusion 106A has a substantially cylindrical structure, as shown in FIG. 1. However, the first protrusion 106A may include any other structure, such as, but not limited to, a substantially rectangular structure, a substantially polygonal structure, and the like.

In an embodiment, the base portion 106 may have a proximal end and a distal end, such that, the proximal end and the distal end forms opposing edges of the base portion 106. In certain instances, the first protrusion 106A may be located at the proximal end of the base portion 106. In other instances, the first protrusion 106A may be located at the distal end of the base portion 106. Based on a location of the first protrusion 106A, the part of the shroud portion 108 may be configured to couple with the first protrusion 106A, to form the cover 104. In an embodiment, the first protrusion 106A may form a male connection and configured to couple with a female connection of the part of the shroud portion 108. In another embodiment, the first protrusion 106A may form a female connection and configured to couple with a male connection of the part of the shroud portion 108.

The second protrusion 106B may be an extension that may extend from the base portion 106 and configured to couple with the shroud portion 108. For example, the second protrusion 106B may horizontally extend from the base portion 106 and such horizontally extended second protrusion 106B may be configured to couple with a part of the shroud portion 108 to form the cover 104. In another example, the second protrusion 106B may be angularly extended from the base portion 106 and such angularly extended second protrusion 106B may be configured to couple with the part of the shroud portion 108 to form the cover 104. In an embodiment, the second protrusion 106B has a substantially cylindrical structure, as shown in FIG. 1. However, the second protrusion 106B may include any other structure, such as, but not limited to, a substantially rectangular structure, a substantially polygonal structure, and the like.

In certain instances, the second protrusion 106B may be located at the distal end of the base portion 106. In other instances, the second protrusion 106B may be located at the proximal end of the base portion 106. Based on a location of the second protrusion 106B, the part of the shroud portion 108 may be configured to couple with the second protrusion 106B, to form the cover 104. In an embodiment, the second protrusion 106B may form a male connection and configured to couple with a female connection of the part of the shroud portion 108. In another embodiment, the second protrusion 106B may form a female connection and configured to couple with a male connection of the part of the shroud portion 108.

The shroud portion 108 may include a suitable design, shape, and structure, which may be configured to form a superstructure (for example, a ceiling garnish) for the cover 104. For example, the shroud portion 108 may include an arcuate section (as shown in FIG. 1, FIG. 2, and FIG. 3), which may be configured to be coupled with the base portion 106, to form the superstructure for the cover 104. Details of the arcuate section is further described, for example, in FIG. 2.

In an embodiment, the shroud portion 108 may span from a front end of the sensor mounting assembly 100 to the rear end of the sensor mounting assembly 100. In another embodiment, the shroud portion 108 may span from a front end of the sensor mounting assembly 100 till a specific portion of the sensor mounting assembly 100. In yet another embodiment, the shroud portion 108 may span from a rear end of the sensor mounting assembly 100 till a specific portion of the sensor mounting assembly 100. The shroud portion 108 may have a substantially arcuate structure, as shown in FIG. 1 and FIG. 2. However, the shroud portion 108 may have any other structure, such as, but not limited to, an inverted U-shaped structure, M-shaped structure, and the like. In an embodiment, the shroud portion 108 may include a first extension 108A, a second extension 108B, a horizontal bend section 108C, a vertical bend section 108D, a viewing window 108E, and an end segment 108F associated with the viewing window 108E.

The first extension 108A may be an extendable support (for example, a support rod) that may extend from the shroud portion 108 and configured to be coupled with the base portion 106. For example, the first extension 108A may vertically extend from the shroud portion 108 and such vertically extended first extension 108A may be configured to couple with a part (for example, the first protrusion 106A) of the base portion 106 to form the cover 104. In another example, the first extension 108A may be angularly extended from the shroud portion 108 and such angularly extended first extension 108A may be configured to couple with the part (such as, the first protrusion 106A) of the base portion 106 to form the cover 104. In an embodiment, the first extension 108A has a substantially cylindrical structure, as shown in FIG. 1. However, the first extension 108A may include any other structure, such as, but not limited to, a substantially rectangular structure, a substantially polygonal structure, and the like.

In an embodiment, the shroud portion 108 may have a proximal end and a distal end, such that, the proximal end and the distal end forms opposing edges of the shroud portion 108. In certain instances, the first extension 108A may be located at the proximal end of the shroud portion 108. In other instances, the first extension 108A may be located at the distal end of the shroud portion 108. Based on a location of the first extension 108A, the part (i.e., the first protrusion 106A) of the base portion 106 may be configured to couple with the first extension 108A, to form the cover 104. In an embodiment, the first extension 108A may form a female connection and configured to couple with a male connection of the part (i.e., the first protrusion 106A) of the base portion 106. In another embodiment, the first extension 108A may form a female connection and configured to couple with a male connection of the part (i.e., the first protrusion 106A) of the base portion 106.

In an embodiment, the first extension 108A may be coupled to the horizontal bend section 108C, to facilitate an optimal coupling between the first extension 108A of the shroud portion 108 and the first protrusion 106A of the base portion 106. For example, the horizontal bend section 108C may be disposed at a distal end of the first extension 108A and configured to couple the first protrusion 106A of the base portion 106. In an embodiment, the horizontal bend section 108C may be disposed substantially perpendicular to the first extension 108A and configured to facilitate the optimal coupling between the first extension 108A of the shroud portion 108 and the first protrusion 106A of the base portion 106.

In an embodiment, the horizontal bend section 108C may form an interference fit between the first extension 108A of the shroud portion 108 and the first protrusion 106A of the base portion 106. In another embodiment, the horizontal bend section 108C may form a releasable fit (for example, a slot and a pin fit) between the first extension 108A (for example, the pin) of the shroud portion 108 and the first protrusion 106A (for example, the slot) of the base portion 106. In an alternate embodiment, the horizontal bend section 108C may include a slot and the first protrusion 106A may include a pin. In such instances, the pin of the first protrusion 106A may be configured to be inserted into the slot of the horizontal bend section 108C.

In yet another embodiment, the horizontal bend section 108C of the second extension 108B of the shroud portion 108 may be configured to mate with the first protrusion 106A of the base portion 106, to seal the shroud portion 108 with the base portion 106 and form the cover 104. In an embodiment, the horizontal bend section 108C and the first extension 108A may be formed from a same material. In another embodiment, the horizontal bend section 108C and the first extension 108A may be formed from a different material.

The second extension 108B may be an extendable support (for example, a support rod) that may extend from the shroud portion 108 and configured to be coupled with the base portion 106. For example, the second extension 108B may be disposed adjacent to the first extension 108A and configured to vertically extend from the shroud portion 108 and such vertically extended second extension 108B may be configured to couple with a part (for example, the second protrusion 106B) of the base portion 106 to form the cover 104. In another example, the second extension 108B may be angularly extended from the shroud portion 108 and such angularly extended second extension 108B may be configured to couple with the part (i.e., the second protrusion 106B) of the base portion 106 to form the cover 104. In an embodiment, the second extension 108B has a substantially cylindrical structure, as shown in FIG. 1. However, the second extension 108B may include any other structure, such as, but not limited to, a substantially rectangular structure, a substantially polygonal structure, and the like.

In certain instances, the second extension 108B may be located at the distal end of the shroud portion 108. In other instances, the second extension 108B may be located at the proximal end of the shroud portion 108. Based on a location of the second extension 108B, the part (i.e., the second protrusion 106B) of the base portion 106 may be configured to couple with the second extension 108B, to form the cover 104. In an embodiment, the second extension 108B may form a female connection and configured to couple with a male connection of the part (i.e., the second protrusion 106B) of the base portion 106. In another embodiment, the second extension 108B may form a male connection and configured to couple with a male connection of the part (i.e., the second protrusion 106B) of the base portion 106.

In an embodiment, the second extension 108B may be coupled to the vertical bend section 108D, to facilitate an optimal coupling between the second extension 108B of the shroud portion 108 and the second protrusion 106B of the base portion 106. For example, the vertical bend section 108D may be disposed at a distal end of the second extension 108B and configured to couple the second protrusion 106B of the base portion 106. In an embodiment, the vertical bend section 108D may be disposed substantially parallel to the second extension 108B and configured to facilitate the optimal coupling between the second extension 108B of the shroud portion 108 and the second protrusion 106B of the base portion 106.

In an embodiment, the vertical bend section 108D may form an interference fit between the second extension 108B of the shroud portion 108 and the second protrusion 106B of the base portion 106. For example, the second extension 108B may include a substantially vertical L-shaped section (i.e., the vertical bend section 108D) and may be configured to circumferentially enclose the second protrusion 106B of the base portion 106 to seal the shroud portion 108 with the base portion 106. Such circumferential sealing may protect the sensor 110 against an ingress of fluids (such as, via a rainfall or other liquids) and an ingress of dust particles from a surrounding environment of the vehicle 102.

In another embodiment, the vertical bend section 108D may form a releasable fit (for example, a slot and a pin fit) between the second extension 108B (for example, the slot) of the shroud portion 108 and the second protrusion 106B (for example, the pin) of the base portion 106. In an alternate embodiment, the vertical bend section 108D may include a pin and the second protrusion 106B may include a slot. In such instances, the pin of the second protrusion 106B may be configured to be inserted into the slot of the vertical bend section 108D.

In yet another embodiment, the vertical bend section 108D of the second extension 108B of the shroud portion 108 may be configured to mate with the second protrusion 106B of the base portion 106, to seal the shroud portion 108 with the base portion 106 and form the cover 104. In an embodiment, the vertical bend section 108D and the second extension 108B may be formed from a same material. In another embodiment, the vertical bend section 108D and the second extension 108B may be formed from a different material.

In an embodiment, the coupling between the first extension 108A and the first protrusion 106A and/or the coupling between the second extension 108B and the second protrusion 106B, may facilitate the shroud portion 108 to be selectively removable from the base portion 106. Hence, it may be easier for the operator to perform precise positioning and assembly of the sensor 110 on the roof of the vehicle 102, which may eventually improve ergonomics in an assembly line of the vehicle 102. Further, it may also be noted that the shroud portion 108 may also be selectively removable from the base portion 106 in a service event (for example, a repair/replacement) of the sensor 110. Hence, as there may not be a requirement for complete removal of the cover 104 and only selective removal of the shroud portion 108 may be required for the service event, there may be a substantial timesaving in the service event of the sensor 110.

In an embodiment, the first extension 108A of the shroud portion 108 has the horizontal bend section 108C, which may be configured to snap-fit with the first protrusion 106A of the base portion 106, to couple the shroud portion 108 with the base portion 106 and form a storage cavity 114. In an example, the horizontal bend section 108C may be mechanically engaged with the first protrusion 106A of the base portion 106. Based on the mechanical engagement, there may be generation of an audible alert (such as, a "click" sound) for the operator to ensure a sealing in a snap-fit connection between the horizontal bend section 108C and the first protrusion 106A.

In another example, instead of the snap-fit connection, there may be other fastening implements to seal the horizontal bend section 108C with the first protrusion 106A, such as, but not limited to, a magnetic coupling, or other mechanical coupling. The storage cavity 114 may be a sealed receptacle formed based on the sealing between the shroud portion 108 and the base portion 106 of the cover 104, such that, the sealed receptacle of the storage cavity 114 may be configured to receive the sensor 110. Based on the reception of the sensor 110, the sensor 110 may be enclosed within the shroud portion 108 of the cover 104.

The shroud portion 108 may further include the viewing window 108E, which may be configured to provide a panoramic view 110A (for example, a 360-degree field-of-view) for the sensor 110 in the sensor mounting assembly 100. In an example, the viewing window 108E may be disposed at the proximal end of the shroud portion 108 and facilitates the panoramic view 110A for the sensor 110. In an embodiment, the viewing window 108E may be formed from a transparent material (such as, a glass material, a quartz material, a sapphire material, and the like). In another embodiment, the viewing window 108E may be tinted based on the user preference. For example, the viewing window 108E may be tinted at a specific color, which may be analogous to a color of a painted coating on a surface of the vehicle 102. Such specialized tinting of the viewing window 108E may improve aesthetics of the vehicle 102.

In an embodiment, the viewing window 108E may be include the end segment 108F, which may be configured to be secured to a portion of the vehicle 102. For example, the end segment 108F may form a seal against the portion of the vehicle 102 and protect the sensor 110 against the ingress of fluids (such as, via the rainfall or other liquids) and the ingress of dust particles from the surrounding environment of the vehicle 102. In another example, the viewing window 108E may be coupled to a portion of the cover 104 and may form a secondary seal to protect the sensor 110 against the ingress of fluids (such as, via the rainfall or other liquids) and the ingress of dust particles from the surrounding environment of the vehicle 102.

In an embodiment, the end segment 108F of the shroud portion 108 may be shown as a block in FIG. 1. However, the end segment 108F of the shroud portion 108 may have any structural profile, such as, a rod, a sphere, or any other polygonal shape, based on user requirements and a level of sealing that may be required for the sensor 110 in the sensor mounting assembly 100.

The sensor 110 may include a suitable circuitry, logic, and network interfaces, which may be secured to a portion of the bracket 112 and configured to capture an image or a plurality of images of one or more objects in the surrounding environment of the vehicle 102. In an embodiment, the sensor 110 may include a 360-degree camera, which may be configured to capture a 360-degree view of the surrounding environment of the vehicle 102. In an embodiment, the 360-degree camera may be a single 360-degree camera (for example, a LiDAR sensor), which may be configured to capture the 360-degree view of the surrounding environment of the vehicle 102.

In another embodiment, the sensor 110 may include a plurality of image sensors (not shown) to capture the 360-degree view of the surrounding environment of the vehicle 102. Each image sensor of the plurality image sensors may be configured to capture a portion of the 360-degree view of the surrounding environment of the vehicle 102. In an embodiment, the sensor 110 (i.e., the 360-degree camera) may be configured to stitch each captured portion of the plurality image sensors to generate the 360-degree view of the surrounding environment of the vehicle 102.

The sensor 110 (such as, the 360-degree camera) may be disposed on the bracket 112 and installed within the sensor mounting assembly 100. Examples of the 360-degree camera may include, but are not limited to, the LiDAR sensor, an omnidirectional camera, a panoramic camera, a charge coupled device (CCD) sensor, a complementary metal oxide semiconductor (CMOS) sensor, a RADAR sensor, an infrared sensor, an image sensor, a wide-angle camera, an action camera, a camcorder, a camera with an integrated depth sensor, a cinematic camera, Digital Single-Lens Reflex (DSLR) camera, a Digital Single-Lens Mirrorless (DSLM) camera, a digital camera, camera phones, a time-of-flight camera (ToF camera), a night-vision camera, and/or other image capturing or devices with 360-degree view capturing capability.

In a preferred embodiment, the sensor 110 may be the LiDAR sensor that has a horizontal field-of-view (for example, the panoramic view 110A of the sensor 110 along a horizontal plane) between 1-360 degrees and further has a vertical field-of-view (for example, the panoramic view 110A of the sensor 110 along a vertical plane) between 1-45 degrees. In an embodiment, the viewing window 108E may be configured to allow at least one of: the horizontal field-of-view and the vertical field-of-view for the sensor 110. In another embodiment, the viewing window 108E may be configured to allow a combination of the horizontal field-of-view and the vertical field-of-view for the sensor 110.

The LiDAR sensor may perform a 360-degrees scan of the surrounding environment to identify a target object. For example, the target object may be identified-based on a laser projection on the target object and a time taken to receive a reflected light from the target object. As the sensor 110 is sealed on the proximal end (such as, via the end segment 108F) of the shroud portion 108 and the distal end (such as, via the second extension 108B) of the shroud portion 108 from the surrounding environment (such as, the rainfall, dust, and the like), there may be a substantial reduction in service events of the sensor 110, which may substantially save service costs of the sensor 110.

The bracket 112 may include a suitable design, shape, and structure, which may be configured to be coupled to the roof rail 102B that may be located beneath the glass roof 102A of the vehicle 102. In an embodiment, the bracket 112 may be configured to be secured to the roof rail 102B from the interior cabin 102C of the vehicle 102, to hold the sensor 110 proximate to the glass roof 102A of the vehicle 102. For example, the bracket 112 may have a substantially rectangular profile to receive the sensor 110 and such substantially rectangular profile may be configured to fixedly secure the sensor 110 via a fastening element (not shown).

In an embodiment, the bracket 112 may be positioned from the interior cabin 102C of the vehicle, to adjust the sensor 110 to be proximate to the glass roof 102A of the vehicle 102. As the bracket 112 and the sensor 110 is configured to be secured to the roof rail 102B from the interior cabin 102C of the vehicle 102, there may not be a need for the operator to climb on to the roof of the vehicle 102 for positioning and assembling the sensor 110. Hence, it may be further easier for the operator to perform precise positioning and assembly of the sensor 110 on the roof of the vehicle 102, which may further improve ergonomics in the assembly line of the vehicle 102.

The vehicle 102 may also include a front windshield 116. The front windshield 116 may be a transparent screen, which may be configured to be formed from a laminated safety glass that may protect the occupants and/or the operator of the vehicle 102 from wind, dust, and any debris that may be received from the surrounding environment of the vehicle 102. The front windshield 116 may also provide a structural support to the vehicle 102. It may be noted that the front windshield 116 shown in FIG. 1 is presented merely as an example of a generic windshield and further description of the front windshield 116 has been omitted from the disclosure for the sake of brevity.

In an embodiment, the front windshield 116 of the vehicle may be secured to a first section 120A (such as a specific area/portion) of the roof rail 102B and the bracket 112 may be secured to a second section 120B (such as another specific area/portion, which may be different from the first section 120A) of the roof rail 102B, such that, the second section 120B being planar to the first section 120A. Such planar alignment may facilitate an improved field-of-view (i.e., the panoramic view 110A) for the sensor 110 secured in the sensor mounting assembly 100.

In another embodiment, to facilitate an optimal sealing between the shroud portion 108 and the base portion 106, the viewing window 108E of the shroud portion 108 has the end segment 108F, which may be secured to a portion of the front windshield 116 of the vehicle 102. For example, the optimal sealing between the end segment 108F and the front windshield 116 may protect the sensor 110 against the ingress of fluids (such as, via the rainfall or other liquids) and the ingress of dust particles from the surrounding environment of the vehicle 102.

In operation with respect to FIG. 1, the sensor mounting assembly 100 to hold the sensor 110 is shown. The sensor mounting assembly 100 may include the cover 104 with the base portion 106 and the shroud portion 108. The base portion 106 may be coupled to the glass roof 102A of the vehicle 102 and may form the first protrusion 106A (for example, a male connector). The shroud portion 108 may have the first extension 108A (for example, a female connector) that may be coupled to the first protrusion 106A and configured to enclose the sensor 110 that may be disposed proximate to the glass roof 102A of the vehicle 102. Such coupling between the first extension 108A and the first protrusion 106A, may facilitate the shroud portion 108 to be selectively removable from the base portion 106. Hence, it may be easier for the operator to perform precise positioning and assembly of the sensor 110 on the roof of the vehicle 102, which may eventually improve ergonomics in the assembly line of the vehicle 102. Further, it may also be noted that the shroud portion 108 may also be selectively removable from the base portion 106 in the service event (for example, a repair/replacement) of the sensor 110. Hence, as there may not be a requirement to completely remove the cover 104 and only selective removal of the shroud portion 108 may be required for the service event, there may be a substantial timesaving in the service event of the sensor 110.

The sensor mounting assembly 100 may further include the bracket 112 that may be coupled to the roof rail 102B that may be located beneath the glass roof 102A of the vehicle 102. The bracket 112 may be configured to be secured to the roof rail 102B from the interior cabin 102C of the vehicle 102, to hold the sensor 110 proximate to the glass roof 102A of the vehicle 102. As the bracket 112 and the sensor 110 is configured to be secured to the roof rail 102B from the interior cabin 102C of the vehicle 102, there may not be a need for the operator to climb on to the roof of the vehicle 102 for positioning and assembling the sensor 110. Hence, it may be further easier for the operator to perform precise positioning and assembly of the sensor 110 on the roof of the vehicle 102, which may further improve ergonomics in the assembly line of the vehicle 102.

FIG. 2 is a diagram that illustrates a cross-sectional view of the sensor mounting assembly of FIG. 1, in accordance with an embodiment of the disclosure. FIG. 2 is explained in conjunction with elements from FIG. 1. With reference to FIG. 2, there is shown a cross-sectional view 200 of the sensor mounting assembly 100 and the vehicle 102, which may be sectioned along the second section B-B, as shown in FIG. 1.

Referring to FIG. 2, there is shown the glass roof 102A of the vehicle 102 that has an opening 202 to receive the sensor mounting assembly 100 (shown in FIG. 1). The base portion 106 of the sensor mounting assembly 100 may form a flange 204 to couple with the glass roof 102A. The flange 204 may be coupled with the glass roof 102A, via an adhesive material 206 that may be disposed between the flange 204 and the glass roof 102A. In certain instances, the shroud portion 108 may further include an intermediate section 208 that may be secured to the roof rail 102B (shown in FIG. 1) from the interior cabin 102C (shown in FIG. 1) of the vehicle 102, to enclose the sensor 110 proximate to the glass roof 102A of the vehicle 102. In such instances, the intermediate section 208 may be disposed at a datum point (not shown), which may be same as a datum point (not shown) of a base of the flange 204.

Referring to FIG. 2, there is shown the opening 202 of the glass roof 102A. The opening 202 of the glass roof 102A may be formed based on a mechanical material removal process (for example, a milling process, a drilling process, a blanking process, a sawing process, and the like). In an example, the opening 202 may be formed with a first diameter 202A, which may be substantially same as a diameter of the sensor mounting assembly 100. In such instances, the flange 204 of the base portion 106 of the sensor mounting assembly 100 may form an interference fit with the opening 202 of the glass roof 102A of the vehicle 102.

The flange 204 may include a suitable design, shape or structure, which may be configured to couple the sensor mounting assembly 100 with the glass roof 102A of the vehicle 102. For example, the flange 204 may form a C-shaped structure (such as, a circumferential collar) against the glass roof 102A, such that, the base portion 106 of the sensor mounting assembly 100 may form an optimal sealing with the glass roof 102A of the vehicle 102. The circumferential collar shown in FIG. 2 is merely an example of the flange 204, and the flange 204 may have any other structural profile based on a structural profile of the opening 202 of the glass roof 102A and corresponding user requirements.

The adhesive material 206 may be disposed between the flange 204 and edges of the opening 202 of the glass roof 102A, such that, the adhesive material 206 facilitates a seal fit between the flange 204 of the sensor mounting assembly 100 and the opening 202 of the glass roof 102A. In an example, the adhesive material 206 may include, but not limited to, a wet adhesive material, a contact adhesive material, a reactive adhesive material, a hot-melt adhesive material, a pressure-sensitive adhesive material, and the like. Based on user requirements, the operator may select a suitable adhesive material (i.e., the adhesive material 206) and dispose between the flange 204 and the edges of the opening 202 of the glass roof 102A, to ensure the seal fit between the flange 204 of the sensor mounting assembly 100 and the opening 202 of the glass roof 102A.

The intermediate section 208 may be an extendable support (for example, a supplementary support rod) that may extend from the shroud portion 108 and configured to be coupled with the base portion 106. For example, the intermediate section 208 may be disposed at a central region of the shroud portion 108 and configured to vertically extend from the shroud portion 108 and such vertically extended intermediate section 208 may be configured to couple with a part of the roof rail 102B of the vehicle 102, to form the cover 104. In another example, the intermediate section 208 may be angularly extended from the shroud portion 108 and such angularly extended intermediate section 208 may be configured to couple with the part of the roof rail 102B of the vehicle 102, to form the cover 104. In an embodiment, the intermediate section 208 may have a substantially cylindrical structure, as shown in FIG. 2. However, the intermediate section 208 may include any other structure, such as, but not limited to, a substantially rectangular structure, a substantially polygonal structure, and the like.

In certain instances, the intermediate section 208 may be located at the central region of the shroud portion 108. In other instances, the intermediate section 208 may be located at the proximal end of the shroud portion 108. In yet other instances, the intermediate section 208 may be located at the distal end of the shroud portion 108. Based on a location of the intermediate section 208, corresponding part of the roof rail 102B may be configured to couple with the intermediate section 208, to form the cover 104.

In operation, the base portion 106 may form the flange 204 that may be configured to couple the edges of the opening 202 to form a flushed configuration with the glass roof 102A. In an embodiment, the flange 204 may be coupled with the edges of the opening 202, via the adhesive material 206, to form the flushed configuration with the glass roof 102A. In an example, the flange 204 may be configured to couple with each edge of the edges of the opening 202, via the adhesive material 206, to form the flushed configuration. In another example, the flange 204 may be configured to couple only with specific edge of the edges of the opening 202, via the adhesive material 206, to form the flushed configuration. Such flushed configuration of the flange 204 may facilitate an improved aesthetics and aerodynamics of the vehicle 102.

In an embodiment, the flange 204 may include the C-shaped structure that may be configured to couple with a first edge (not shown) and a second edge (not shown) of the opening 202 via the adhesive material 206, to form the flushed configuration. The flushed configuration may indicate that a datum level of the flange 204 is same as a datum level of the glass roof 102A. Such similarity in datum level of the flange 204 and the glass roof 102A may facilitate an improved field-of-view for the sensor 110 in the sensor mounting assembly 100.

In another embodiment, the flange 204 may include the second protrusion 106B that may be coupled with the second extension 108B to seal the shroud portion 108 with the flange 204 (i.e., base portion 106). Such sealing of the flange 204 with the shroud portion 108 may protect the sensor 110 against the ingress of fluids (such as, via the rainfall or other liquids) and the ingress of dust particles from the surrounding environment of the vehicle 102.

In yet another embodiment, the sensor 110 may be inserted within the opening 202 to reach the storage cavity 114 such that a base of the sensor 110 may be located proximate to the glass roof 102A of the vehicle 102. For example, the sensor 110 may be inserted within the opening 202 of the glass roof 102A, via the interior cabin 102C of the vehicle 102. As the bracket 112 and the sensor 110 is configured to be secured to the opening 202 of the glass roof 102A, via the interior cabin 102C of the vehicle 102, there may not be a need for the operator to climb on to the roof of the vehicle 102 for positioning and assembling the sensor 110. Hence, it may be further easier for the operator to perform precise positioning and assembly of the sensor 110 on the roof of the vehicle 102, which may further improve ergonomics in the assembly line of the vehicle 102.

FIG. 3 is a diagram that illustrates an exemplary scenario to perform a service event for the sensor mounting assembly of FIG. 1, in accordance with an embodiment of the disclosure. FIG. 3 is explained in conjunction with elements from FIG. 1, and FIG. 2. With reference to FIG. 3, there is shown an exemplary scenario 300 to perform a service event for the sensor mounting assembly 100 in the vehicle 102. The vehicle 102 may include the glass roof 102A that may be located at a first datum level 302 from the roof rail 102B. The sensor mounting assembly 100 may include the sensor 110 that may have a base, which may be located at a second datum level 304 from the roof rail 102B. In an embodiment, the second datum level 304 may be higher than the first datum level 302.

In an embodiment, the base portion 106 may be pre-assembled with the glass roof 102A, and the shroud portion 108 may be removably coupled to the base portion 106, such that, the shroud portion 108 may be configured to be removed from exterior of the vehicle, in the service event of the sensor 110. For example, the base portion 106 may be fixedly coupled to the glass roof 102A before the components of the sensor mounting assembly 100 reaches the assembly line of the vehicle 102. However, the shroud portion 108 may be removably coupled to the base portion 106, such that, in the service event of the sensor 110, the shroud portion 108 may be selectively removed from an exterior portion (not shown) of the vehicle 102, without dismantling other components (such as the bracket 112) of the sensor mounting assembly 100.

In operation, the service event may be performed. In the service event, the shroud portion 108 may be released/ removed from the base portion 106. For example, at least one or a combination of component(s), such as, the first extension 108A, the second extension 108B, or the intermediate section 208 of the shroud portion 108, may be released/removed from a corresponding component (such as, the first protrusion 106A, the second protrusion 106B of the base portion 106, or the roof rail 102B) of the sensor mounting assembly 100. Based on the release/removal of the component(s) of the shroud portion 108, the operator may perform the service event on the sensor 110. Based on a completion of the service event of the sensor 110, at least one or a combination of component(s), (such as, the first extension 108A, the second extension 108B, or the intermediate section 208) of the shroud portion 108, may be re-coupled with a corresponding component (such as, the first protrusion 106A, the second protrusion 106B of the base portion 106, or the roof rail 102B) of the sensor mounting assembly 100, to facilitate an optimal sealing provision for the sensor 110. Such optimal sealing provision of the sensor mounting assembly 100 after the service event, may protect the sensor 110 against the ingress of fluids (such as, via the rainfall or other liquids) and the ingress of dust particles from the surrounding environment of the vehicle 102, and may improve a service life of the sensor 110.

Figure 4:
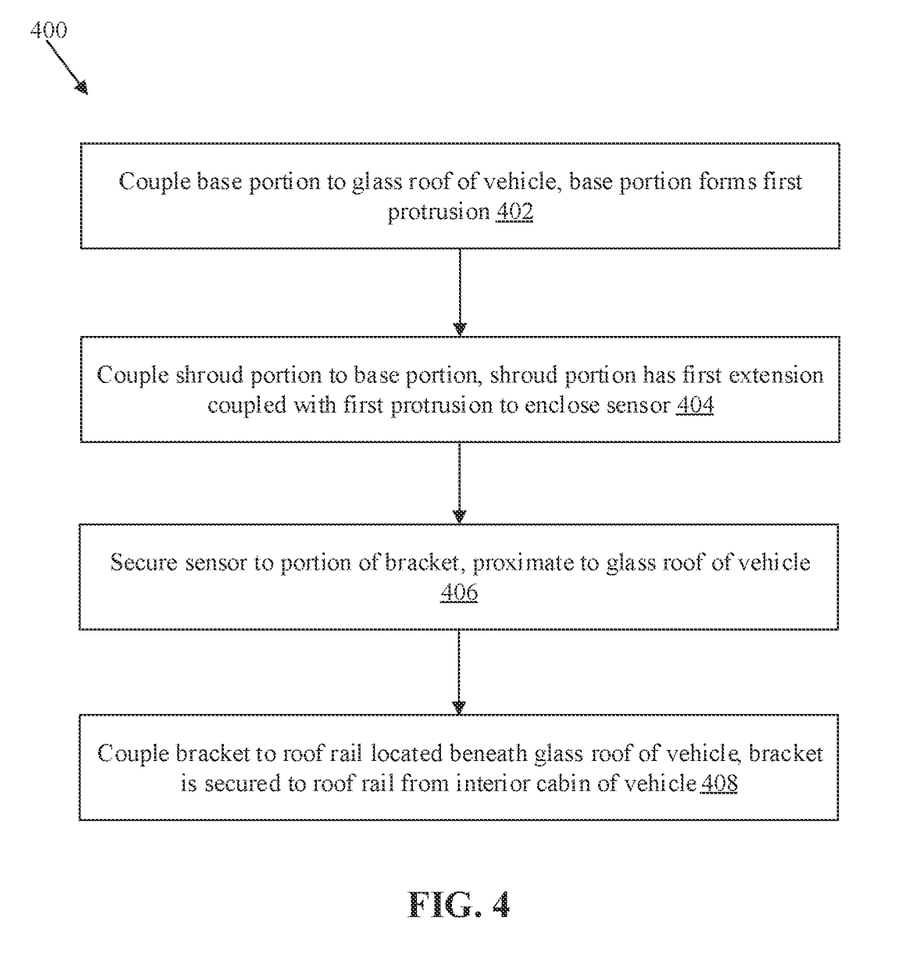
FIG. 4 is a flowchart that illustrates exemplary operations for forming a sensor mounting assembly, in accordance with an embodiment of the disclosure.

FIG. 4 is a flowchart that illustrates exemplary operations for forming a sensor mounting assembly, in accordance with an embodiment of the disclosure. FIG. 4 is explained in conjunction with elements from FIG. 1, FIG. 2, and FIG. 3. With reference to FIG. 4, there is shown a flowchart 400. The operations from 402 to 408 may be implemented, for example, by the sensor mounting assembly 100 or an operator associated with the sensor mounting assembly 100. The operations of the flowchart 400 may start at 402.

At 402, the base portion 106 may be coupled to the glass roof 102A of the vehicle 102. In an embodiment, the sensor mounting assembly 100 or the operator may couple the base portion 106 to the glass roof 102A of the vehicle 102, as described further, for example, in FIG. 1, and FIG. 2.

At 404, the shroud portion 108 may be coupled to the base portion 106, where the shroud portion 108 has the first extension 108A that may be coupled to the first protrusion 106A to enclose the sensor 110. In an embodiment, the sensor mounting assembly 100 or the operator may couple the shroud portion 108 to the base portion 106, as described further, for example, in FIG. 1 and FIG. 2.

At 406, the sensor 110 may be secured to the portion of the bracket 112, proximate to the glass roof 102A. In an embodiment, the sensor mounting assembly 100 or the operator may secure the sensor 110 to the portion of the bracket 112, as described further, for example, in FIG. 1, FIG. 1 and FIG. 2.

At 408, the bracket 112 may be coupled to the roof rail 102B that may be located beneath the glass roof 102A of the vehicle 102 and secured to the roof rail 102B from the interior cabin 102C of the vehicle 102. In an embodiment, the sensor mounting assembly 100 or the operator may couple the bracket 112 to the roof rail 102B that may be located beneath the glass roof 102A of the vehicle 102 and secure the bracket 112 to the roof rail 102B from the interior cabin 102C of the vehicle 102, as described further, for example, in FIG. 1, FIG. 1 and FIG. 2.

The flowchart shown in FIG. 4 is illustrated as discrete operations, such as from 402 to 408, which relates to the method of forming the sensor mounting assembly 100. However, in certain embodiments, such discrete operations may be further divided into additional operations, combined into fewer operations, or eliminated, depending on the implementation without detracting from the essence of the disclosed embodiments.

For the purposes of the present disclosure, expressions, such as "including", "comprising", "incorporating", "consisting of", "have", "is", used to describe and claim the present disclosure, are intended to be construed in a non-exclusive manner, namely allowing for items, components or elements not explicitly described also to be present. Reference to the singular is also to be construed to relate to the plural. Further, all joinder references (e.g., attached, coupled, connected, o the like) are used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A sensor mounting assembly, comprising:
    a cover having a base portion and a shroud portion, wherein the base portion is coupled to a glass roof of a vehicle and forms a first protrusion, and the shroud portion has a first extension that is coupled to the first protrusion and is configured to enclose a sensor that is disposed proximate to the glass roof of the vehicle; and
    a bracket coupled to a roof rail that is located beneath the glass roof of the vehicle, wherein the bracket is configured to be secured to the roof rail from an interior cabin of the vehicle, to hold the sensor proximate to the glass roof of the vehicle.

2. The sensor mounting assembly of claim 1, wherein the first extension has a horizontal bend section and is configured to snap-fit with the first protrusion of the base portion to couple the shroud portion with the base portion and form a storage cavity.

3. The sensor mounting assembly of claim 2, wherein:
    the glass roof has an opening; and
    the sensor is inserted within the opening to reach the storage cavity such that a base of the sensor is proximate to the glass roof of the vehicle.

4. The sensor mounting assembly of claim 2, wherein the shroud portion has an intermediate section secured to the roof rail from the interior cabin of the vehicle to enclose the sensor proximate to the glass roof of the vehicle.

5. The sensor mounting assembly of claim 1, wherein:
    the glass roof has an opening; and
    the base portion forms a flange to couple edges of the opening to form a flushed configuration with the glass roof.

6. The sensor mounting assembly of claim 5, wherein:
    the shroud portion has a second extension; and the flange forms a second protrusion coupled with the second extension to seal the shroud portion with the base portion.

7. The sensor mounting assembly of claim 6, wherein the second extension has a substantially vertical L-shaped section and is configured to circumferentially enclose the second protrusion of the base portion to seal the shroud portion with the base portion.

8. The sensor mounting assembly of claim 5, wherein the flange is configured to couple with each edge of the edges of the opening via an adhesive material.

9. The sensor mounting assembly of claim 5, wherein the flange has a C-shaped structure that is configured to couple with a first edge and a second edge of the opening via an adhesive material.

10. The sensor mounting assembly of claim 1, wherein the sensor is a LiDAR sensor that has a horizontal field-of-view between 1-360 degrees and a vertical field-of-view between 1-45 degrees.

11. The sensor mounting assembly of claim 10, wherein the shroud portion has a viewing window to allow at least one of: the horizontal field-of-view and the vertical field-of-view for the sensor.

12. The sensor mounting assembly of claim 11, wherein the viewing window has an end segment that is secured to a portion of a front windshield of the vehicle.

13. The sensor mounting assembly of claim 12, wherein the front windshield of the vehicle is secured to a first section of the roof rail and the bracket is secured to a second section of the roof rail, the second section being planar to the first section.

14. The sensor mounting assembly of claim 11, wherein the viewing window is coupled to a portion of the cover.

15. The sensor mounting assembly of claim 1, wherein the base portion is pre-assembled with the glass roof, and the shroud portion is removably coupled to the base portion, such that, the shroud portion is configured to be removed from exterior of the vehicle, in a service event of the sensor.

16. A sensor mounting assembly, comprising:
    a cover having a base portion and a shroud portion wherein:
        the base portion is coupled to a glass roof of a vehicle and forms a first protrusion; and
        the shroud portion has a first extension that is coupled to the first protrusion and is configured to enclose a sensor that is disposed proximate to the glass roof of the vehicle; and
    a bracket coupled to a roof rail that is located beneath the glass roof of the vehicle and configured to be secured to the roof rail from an interior cabin of the vehicle to hold the sensor proximate to the glass roof of the vehicle wherein:
        the base portion is pre-assembled with the glass roof, and the shroud portion is removably coupled to the base portion, such that, the shroud portion is configured to be removed from exterior of the vehicle, in a service event of the sensor.

17. The sensor mounting assembly of claim 16, wherein the glass roof is located at a first datum level, and the sensor has a base located at a second datum level higher than the first datum level.

18. The sensor mounting assembly of claim 16, wherein:
    the glass roof has an opening; and
    the base portion forms a flange that is coupled to edges of the opening to form a flushed configuration with the glass roof.

19. The sensor mounting assembly of claim 18, wherein the flange is configured to couple with each edge of the edges of the opening via an adhesive material.

20. A method of forming a sensor assembly, comprising the steps of:
    coupling a base portion to a glass roof of a vehicle, wherein the base portion forms a first protrusion;
    coupling a shroud portion to the base portion, the shroud portion has a first extension that is coupled to the first protrusion, wherein the shroud portion is configured to enclose a sensor that is disposed proximate to the glass roof of the vehicle;
    securing the sensor to a portion of a bracket, wherein the bracket is configured to hold the sensor proximate to the glass roof of the vehicle; and
    coupling the bracket to a roof rail that is located beneath the glass roof of the vehicle, wherein the bracket is configured to be secured to the roof rail from an interior cabin of the vehicle.

* * * * *